(12) United States Patent
Graves (10) Patent No.: US 10,583,821 B2
(45) Date of Patent: Mar. 10, 2020

(54) BRAKE WARNING SYSTEM AND METHODS

(71) Applicant: DENSO International America, Inc., Southfield, MI (US)

(72) Inventor: Jason Graves, Oceanside, CA (US)

(73) Assignee: DENSO International America, Inc., Southfield, MI (US)

( * ) Notice: Subject to any disclaimer, the term of this patent is extended or adjusted under 35 U.S.C. 154(b) by 250 days.

(21) Appl. No.: 15/714,528

(22) Filed: Sep. 25, 2017

(65) Prior Publication Data

US 2019/0092308 A1   Mar. 28, 2019

(51) Int. Cl.
  *B60T 17/22*  (2006.01)
  *G05B 23/02*  (2006.01)
  *F16D 66/02*  (2006.01)

(52) U.S. Cl.
  CPC .......... *B60T 17/221* (2013.01); *F16D 66/021* (2013.01); *G05B 23/0264* (2013.01); *G05B 23/027* (2013.01); *G05B 23/0283* (2013.01)

(58) Field of Classification Search
  CPC .... B60T 17/221; F16D 66/021; B60W 40/00; G05B 23/0264; G05B 23/0283; G05B 23/027
  See application file for complete search history.

(56) References Cited

U.S. PATENT DOCUMENTS

| 9,315,178 | B1 * | 4/2016 | Ferguson | B60T 17/221 |
| 2010/0280729 | A1 * | 11/2010 | Samsioe | B60T 7/22 |
| | | | | 701/93 |
| 2017/0291591 | A1 * | 10/2017 | Steer | B60T 8/885 |

FOREIGN PATENT DOCUMENTS

| GB | 2378248 A | | 2/2003 | |
| GB | 2462864 A | * | 2/2010 | B60T 7/20 |

* cited by examiner

*Primary Examiner* — Alan D Hutchinson
(74) *Attorney, Agent, or Firm* — Harness, Dickey & Pierce, P.L.C.

(57) ABSTRACT

A system and method for warning a vehicle of brake deterioration including (i) detecting conditions that impact brake performance of a primary vehicle through a plurality of sensors; (ii) receiving information from the plurality of sensors; (iii) determining data for a brake event; (iv) storing the brake event data in a bin; (v) determining an average of the brake data for the bin; (vi) determining whether a rate at which the average of the brake data for the bin is increasing over time is greater than a first predetermined threshold; (vii) flagging the bin when the average of the brake data for the bin is increasing over time greater than a first predetermined threshold; (viii) determining whether a number of flagged bins is greater than a second predetermined threshold; and (ix) generating an alert to a driver when the number of flagged bins is greater than the second predetermined threshold.

20 Claims, 6 Drawing Sheets

BRAKE WARNING SYSTEM AND METHODS

FIELD

The present disclosure relates to a brake warning system and methods for a vehicle.

BACKGROUND

This section provides background information related to the present disclosure which is not necessarily prior art.

Many drivers are unaware of the condition of the vehicle's brakes and/or tires. As a vehicle ages, naturally, so do the vehicle's brakes and tires. Aging of the vehicle's brakes and/or tires leads to deterioration of the vehicle's brakes and/or tires. Deterioration in a vehicle's brakes and/or tires can cause increased stopping distance/time. Many drivers do not notice the extra distance/time required to stop because the extra distance/time is increasing gradually over time. The extra distance/time may be due to the vehicle's worn brakes and/or worn tires. There are specialized sensors that monitor the wear and tear of brakes and/or tires. However, these specialized sensors are costly and are hard to retrofit for an existing vehicle. The present teachings make use of many of the existing sensors included in vehicles to evaluate brake performance and to provide drivers with a brake deterioration warning in response to determining that brake performance has deteriorated. Once the warning is provided, drivers may have their vehicles, in particular, brakes and/or tires evaluated by a service professional.

Additionally, the brake deterioration warning may be transmitted to other vehicles or devices nearby the vehicle with deteriorated brake performance using short range communication forms such as dedicated short range communication (DSRC). Other forms of short range communication may also be used in lieu of DSRC.

BRIEF DESCRIPTION OF THE DRAWINGS

The present disclosure will become more fully understood from the detailed description and the accompanying drawings.

The drawings described herein are for illustrative purposes only of selected embodiments and not all possible implementations, and are not intended to limit the scope of the present disclosure.

In the drawings, reference numbers may be reused to identify similar and/or identical elements.

SUMMARY

This section provides a general summary of the disclosure, and is not a comprehensive disclosure of its full scope or all its features.

A system is provided and includes a brake warning system that includes a plurality of sensors configured to detect conditions that impact brake performance of a primary vehicle. The brake warning system also includes a brake evaluation system of the primary vehicle configured to (i) receive information from at least one of the plurality of sensors; (ii) determine brake event data for a brake event associated with actuating a brake system of the primary vehicle, the brake event data including at least one of a braking time and a braking distance; (iii) store the brake event data in a bin that corresponds to braking conditions associated with the brake event; (iv) determine an average of the brake data for the bin; (v) determine whether a rate at which the average of the brake data for the bin is increasing over time is greater than a first predetermined threshold; (vi) flag the bin in response to the determining that the rate at which the average of the brake data for the bin is increasing over time is greater than a first predetermined threshold; (vii) determine whether a number of flagged bins is greater than a second predetermined threshold; and (viii) generate a driver alert signal in response to determining that the number of flagged bins is greater than the second predetermined threshold. The brake warning system also includes a brake alert control system configured to generate an alert to a driver of the primary vehicle in response to receiving the driver alert signal.

A method is also provided and includes warning a vehicle of brake deterioration. The method includes (i) detecting conditions that impact brake performance of a primary vehicle through a plurality of sensors; (ii) receiving information from at least one of the plurality of sensors; (iii) determining brake event data for a brake event associated with actuating a brake system of the primary vehicle; (iv) storing the brake event data in a bin that corresponds to braking conditions associated with the brake event; (v) determining an average of the brake data for the bin; (vi) determining whether a rate at which the average of the brake data for the bin is increasing over time is greater than a first predetermined threshold; (vii) flagging the bin in response to determining that the rate at which the average of the brake data for the bin is increasing over time greater than a first predetermined threshold; (viii) determining whether a number of flagged bins is greater than a second predetermined threshold; and (ix) generating an alert to a driver of a primary vehicle in response to determining that the number of flagged bins is greater than the second predetermined threshold.

Further areas of applicability of the present disclosure will become apparent from the detailed description, the claims, and the drawings. The detailed description and specific examples are intended for purposes of illustration only and are not intended to limit the scope of the disclosure.

DETAILED DESCRIPTION

Example embodiments will now be described more fully with reference to the accompanying drawings.

Figure 1:
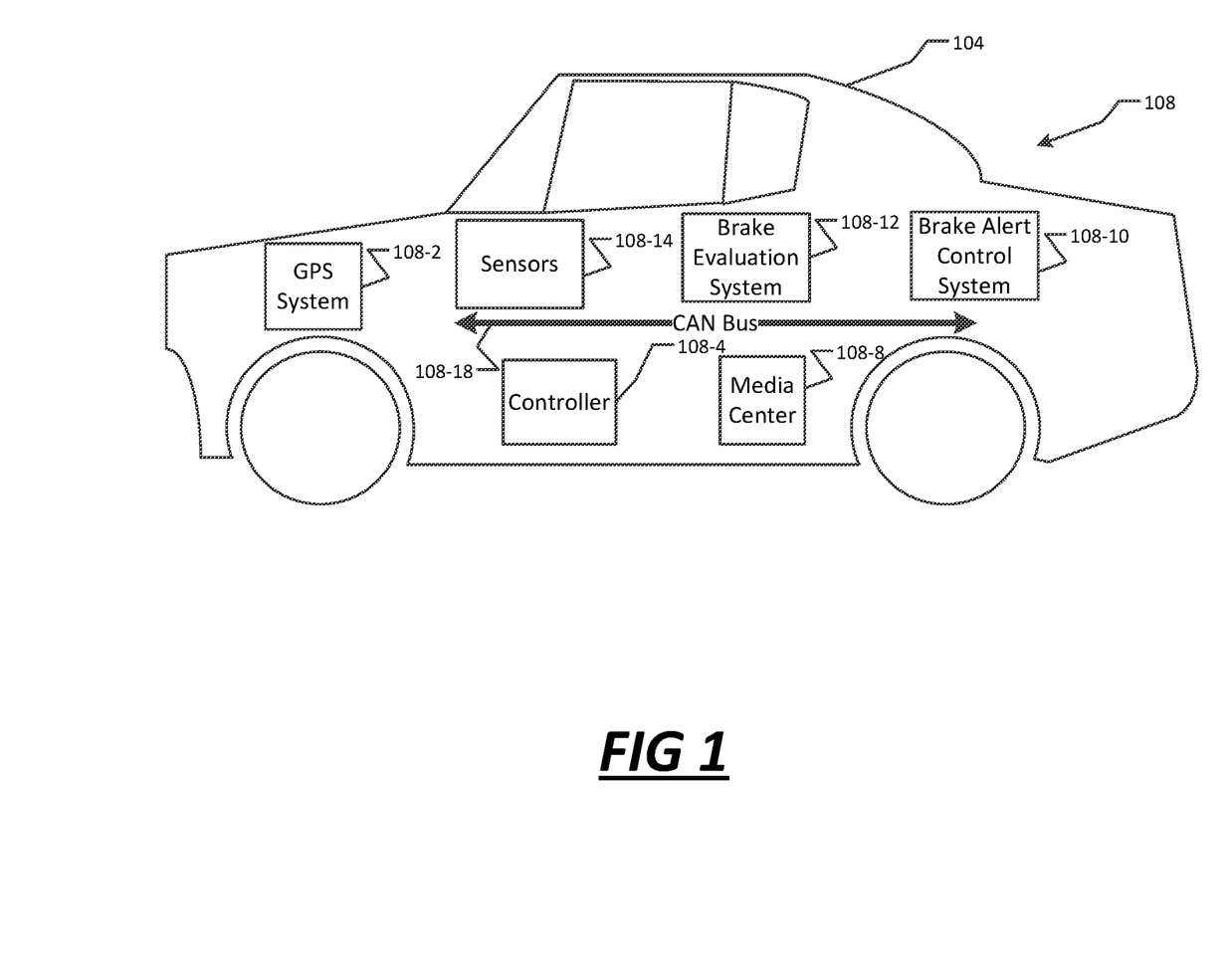
FIG. 1 illustrates an example vehicle including a brake warning system.

With reference to FIG. 1, an example of a primary vehicle 104 including a brake warning system 108 according to the present teachings is illustrated. Although the primary vehicle 104 is illustrated as an automobile in FIG. 1, the present teachings apply to any other suitable vehicle, such as a sport utility vehicle (SUV), a mass transit vehicle (such as a bus), or a military vehicle, as examples. The brake warning system 108 is configured to alert or warn a driver of the primary vehicle 104 in response to the determination that brake performance has deteriorated or is deteriorating. The brake warning system 108 may generally include a global positioning system (GPS) system 108-2, a controller 108-4, a controller area network (CAN) bus 108-18, a media center 108-8, a brake alert control system 108-10, a brake evaluation system 108-12, and at least one of a plurality of sensors 108-14.

The controller 108-4 can be any suitable controller 108-4. The controller 108-4 monitors and/or controls one or more of the GPS system 108-2, the media center 108-8, the brake alert control system 108-10, the brake evaluation system 108-12, at least one of the plurality of sensors 108-14 and/or additional vehicle systems and functions. The various systems of the brake warning system 108 are connected through the CAN bus 108-18. The various systems of the brake warning systems 108 may communicate with the controller and each other through the CAN bus 108-18. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller 108-4 and systems described herein.

The GPS system 108-2 is configured to provide a location of the primary vehicle 104, a movement path for the primary vehicle 104, and an elevation profile for the movement path of the primary vehicle 104. While an example of the GPS system 108-2 is provided, any other suitable system or combination of systems may be used such as a global navigation satellite system (GNSS), a geographic information system (GIS) and/or a web mapping system.

The sensors 108-14 are configured to identify and/or detect conditions that may impact brake performance of the primary vehicle 104. The sensors 108-14 can include any suitable sensor for detecting braking conditions that may impact brake or stopping performance including sensors that are situated within the interior of the primary vehicle 104 and sensors that are situated on the exterior of the primary vehicle 104. The sensors 108-14 situated on the exterior of the primary vehicle 104 can be mounted at any suitable position on the primary vehicle 104.

The sensors 108-14 of the primary vehicle 104 may include at least one of: an accelerator pedal position sensor, a brake pedal position sensor, a throttle position sensor, a traction sensor, a road condition sensor, a tire pressure sensor, a temperature sensor, an inertial measurement unit (IMU) sensor, a lidar sensor, a radar sensor, a sonar sensor, a collision detection sensor, a weight sensor, a camera, a wheel speed sensor, a vehicle speed sensor, an anti-lock braking system (ABS) sensor, and/or other suitable sensors for detecting vehicle and environmental conditions.

A traction sensor of the sensors 108-14 may be configured to detect hazardous road conditions (e.g., slippery road conditions, such as due to ice or rain, loose gravel, etc.). A tire pressure sensor of the sensors 108-14 may be used to detect when tire pressure is too high or too low. A temperature sensor of the sensors 108-14 may be used to detect the ambient outdoor temperature. A weight sensor of the sensors 108-14 may be used to detect the weight of the vehicle due to occupants and cargo. An IMU sensor of the sensors 108-14 may detect a slope of the primary vehicle 104, which may be used to calculate road slope. While a list of example sensors is provided, any suitable sensor may be used that is capable of providing information related to conditions that may impact brake performance or stopping performance of the primary vehicle 104. The brake pedal sensor of the sensors 108-14 provides the position of the brake pedal and determines when the brake system of the primary vehicle 104 is actuated. From the position of the brake pedal, various brake event data may be calculated such as the braking distance and the braking time.

Figure 2:
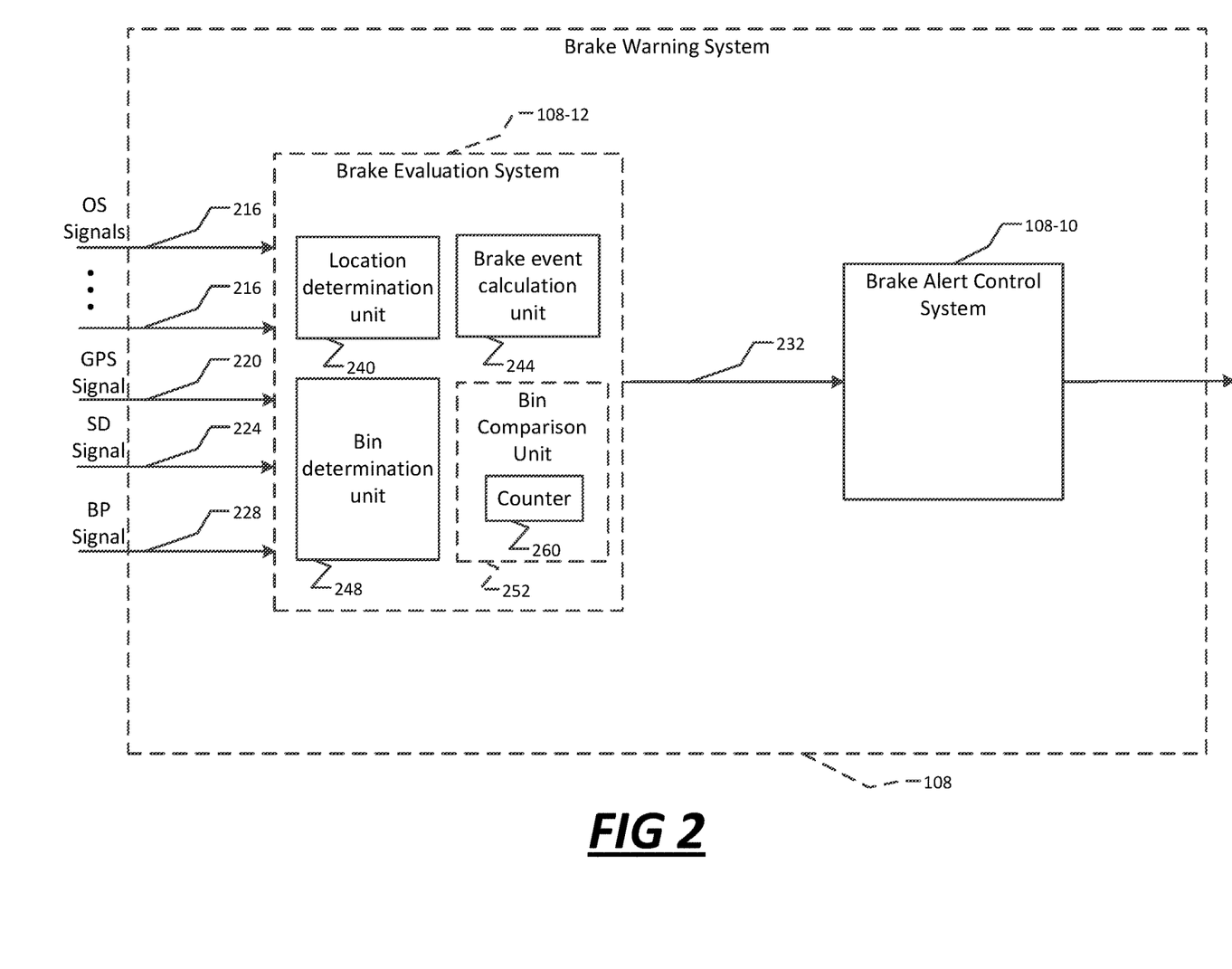
FIG. 2 is a functional block diagram of the brake warning system.

With reference to FIG. 2, a block diagram of the brake warning system 108 is shown. The brake warning system 108 includes the brake evaluation system 108-12 and the brake alert control system 108-10. The brake evaluation system includes a location determination unit 240, a brake event calculation unit 244, a bin determination unit 248, and a bin comparison unit 252. The brake evaluation system 108-12 receives a BP (brake pedal) signal 228 from the brake pedal position sensor of the sensors 108-14, a SD (speed) signal 224 from the vehicle speed sensor of the sensors 108-14, OS (other sensor) signals 216 from the sensors 108-14, and a GPS signal 220 from the GPS system 108-2.

Once the brake evaluation system 108-12 receives the SD signal 224 from the vehicle speed sensor of the sensors 108-14 and BP signal 228 from the brake pedal position sensor of the sensors 108-14, the brake evaluation system 108-12 performs various calculations and functions to evaluate brake performance and determine when brake performance of the primary vehicle 104 has deteriorated or is deteriorating. In some embodiments the GPS system 108-2 may provide the SD signal 224. As such, the brake warning system 108 is compatible with vehicles that are not equipped with vehicle speed sensors. In other embodiments, the GPS signal 220 and the OS signals 216 shown in FIG. 2 may not be required in order for the brake warning system 108 to evaluate brake performance. As such, the brake warning system 108 is compatible with vehicles that are not equipped with the GPS system 108-2 or the other sensors.

Initially, when the primary vehicle is first equipped with the brake warning system 108, the brake evaluation system 108-12 will have no data for brake events stored in or allocated to any of the bins. The brake evaluation system 108-12 will initially collect data for brake events over an initialization period before the system is enabled to perform the desired brake evaluation. Additionally or alternatively, the brake warning system 108 may be preconfigured to store a predetermined initial set of baseline standards in the memory of the brake evaluation system 108-12. The predetermined initial set of baseline standards may be set according to manufacturer performance standards for ideal braking time/distance.

During operation, the brake event calculation unit 244 determines data for a brake event. The brake event calculation unit 244 receives the BP signal 228 from the brake pedal position sensor of the sensors 108-14 and the SD signal 224 from the vehicle speed sensor of the sensors 108-14 to determine brake event data. Brake event data is used throughout the disclosure to refer to brake performance of the primary vehicle 104 measured by the braking time and/or the braking distance of the brake event. The braking time begins when a brake pedal of the primary vehicle 104 is first engaged and ends when the primary vehicle 104 is stopped and/or the brake pedal of the primary vehicle is disengaged. The braking distance begins where the brake pedal of the primary vehicle 104 is first engaged and ends where the primary vehicle 104 is stopped and/or when the brake pedal of the primary vehicle is disengaged. For example, the primary vehicle 104 is considered to have come to a stop once the speed of the primary vehicle 104 is at zero or within a predetermined nominal amount of zero since absolute zero may rarely be achieved.

Brake distance may also be calculated using the location determination unit 240. The location determination unit 240 receives data from the GPS signal 220 and the BP signal 228 to determine a first location of the primary vehicle 104 corresponding to a location where the brake pedal of the primary vehicle 104 is first engaged and a second location of the primary vehicle 104 corresponding to a location where the primary vehicle 104 is stopped and/or the brake pedal of the primary vehicle 104 is disengaged.

The bin determination unit 248 is configured to determine whether a corresponding bin currently exists for a particular brake event and, in response to the determination, stores data for the particular brake event in an existing bin with similar brake events. When a corresponding bin does not currently exist for the particular brake event, the bin determination unit 248 is configured to generate a new bin for the brake event and store the brake event data in the newly generated bin.

The system may utilize any number of bins to represent the wide variety of conditions that impact brake performance of the primary vehicle 104. For example, there may be a bin for highway driving and another bin for city driving. The highway bin and city bin may be further subdivided into wet driving conditions vs dry driving conditions. For example, the system may utilize a highway driving wet bin and a highway driving dry bin. The bins could further be subdivided based on speed of the primary vehicle 104. For example, the system may utilize a bin for 20-35 MPH, another bin for 35-50 MPH, yet another bin for 50-65 MPH and so forth. Bins could also be subdivided based on slope of the road/highway, type of road (gravel, concrete, dirt etc.), outdoor ambient temperature, and/or any other roadway or environmental conditions. The list of bins and subdivision of bins is not meant to be exhaustive and is only provided as an example for how bins could be divided. Bins may be divided in any suitable manner to distinguish between different conditions that impact brake performance.

The bin comparison unit 252 determines whether a rate at which the average of the brake data for a particular bin is increasing over time is greater than a first predetermined threshold. In response to such a determination, the bin comparison unit 252 can flag the bin. The bin comparison unit 252 may flag the bin or mark the bin in any suitable manner. Additionally or alternatively, the bin comparison unit 252 may compare the bin's brake data or an individual brake event's data to the predetermined set of baseline standards stored in the memory of the brake evaluation system 108-12. The brake warning system 108 may provide an option for the driver of the primary vehicle to configure the system to utilize manufacturer standards for the comparison and/or to utilize the primary vehicle's brake history for the comparison. In instances where there are not enough brake events stored in the bins, the compare to manufacturer standards option may be automatically enabled.

The bin comparison unit 252 determines whether the average brake data for a bin is increasing over time. If the rate at which the average of the brake data for the bin is increasing over time, the bin comparison unit 252 determines whether the increase is greater than the first predetermined threshold. If the first predetermined threshold is surpassed, the bin comparison unit 252 flags the bin. The bin comparison unit 252 contains a counter 260. When a bin is flagged by the bin comparison unit 252, the counter 260 is incremented (corresponding to the number of flagged bins). In response to the determination that the counter is greater than a second predetermined threshold (when the number of flagged bins exceeds the second predetermined threshold), the bin comparison unit 252 sends a driver alert signal 232 to the brake alert control system 108-10 to provide the driver of the primary vehicle 104 with a brake deterioration warning.

The brake alert control system 108-10 is configured to, in response to receiving the driver alert signal 232, generate a visual alert by way of a first device of the primary vehicle 104 capable of displaying the visual alert. For example the visual alert may be a light or message that illuminates on a display or other suitable device of the primary vehicle 104. Additionally or alternatively, the brake alert control system 108-10 may generate an audible alert by way of a second device of the primary vehicle 104 capable of producing the audible alert. For example, the audible alert may be a spoken message or audible sound sent to the radio or speakers of the primary vehicle 104. The audible or visual alert provided to the primary driver indicates that brakes and/or tires of the primary vehicle need to be serviced. Once one or more brakes of the primary vehicle are serviced and/or one or more tires of the primary vehicle are serviced, a technician or the driver may reset the counter.

Figure 3:
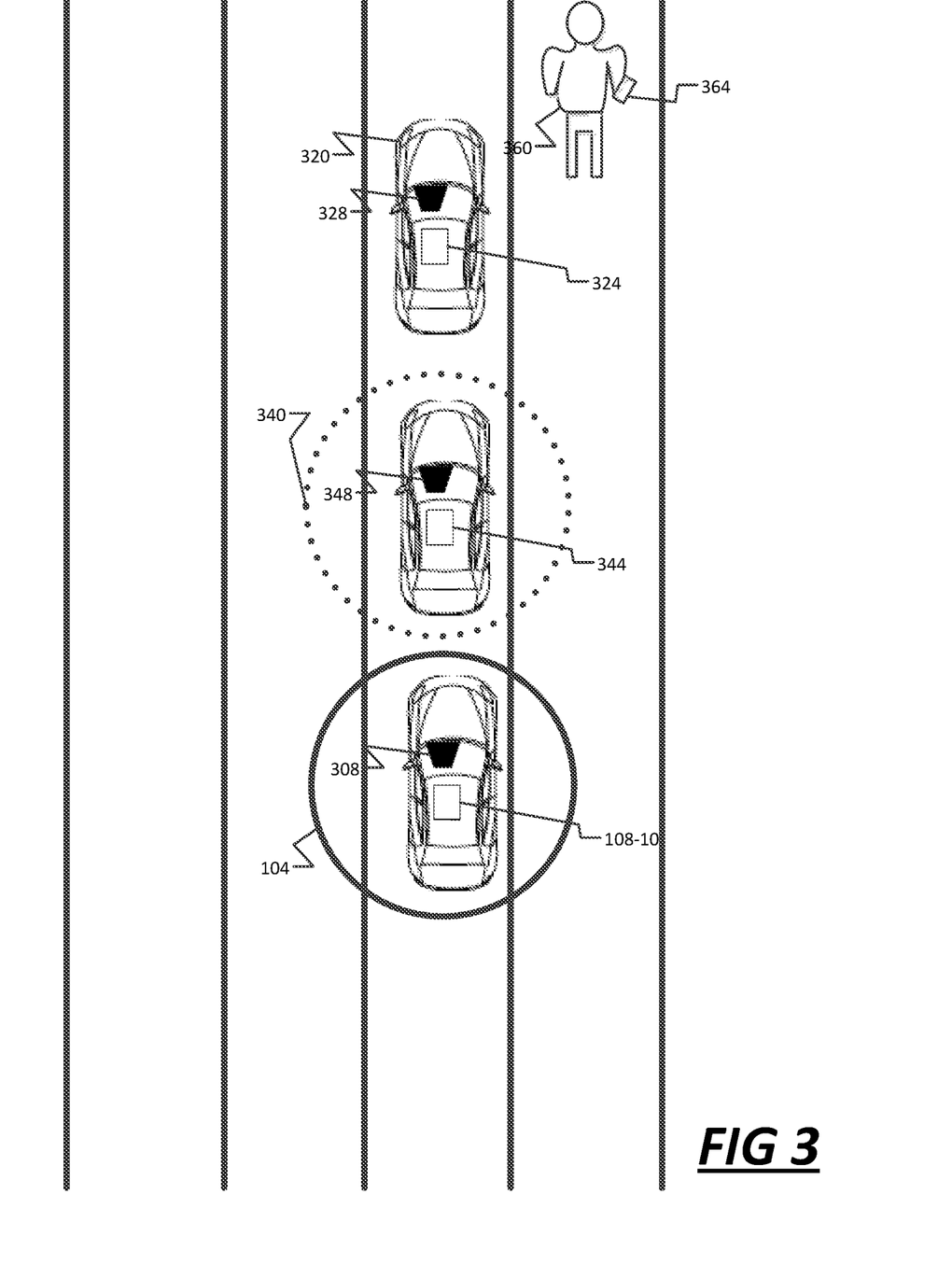
FIG. 3 is an example of a primary vehicle equipped with the brake warning system, a secondary vehicle, an intermediate vehicle, and a pedestrian holding a secondary device each equipped to communicate using dedicated short range communication (DSRC).

With reference to FIG. 3, the brake warning system 108 may be configured to provide the brake deterioration warning to a driver of a secondary vehicle 320 when prompted by the brake alert control system 108-10. The primary vehicle 104 may include a primary transceiver 308, which can be any suitable transceiver including a DSRC transceiver. The secondary vehicle 320 may also be equipped with a secondary transceiver 328, which can be any suitable transceiver including a DSRC transceiver.

The secondary transceiver 328 is configured to receive data transmitted by the primary transceiver 308 of the primary vehicle 104, which can include the brake deterioration warning or any other information related to braking performance of the primary vehicle 104. In the most basic form, the brake deterioration warning may just be a message or signal indicating that the primary vehicle 104 has deteriorated brake performance. In a more advanced form, the brake deterioration warning may include other information related to operating parameters of the primary vehicle 104. Any suitable operating parameter may be provided by the primary vehicle 104 to the secondary vehicle 320, such as the primary vehicle's 104 speed, the primary vehicle's 104 distance relative to the secondary vehicle 320, and the primary vehicle's intended route. Data received by the secondary transceiver 328 is processed by a vehicle control module 324 of the secondary vehicle 320.

The vehicle control module 324 of the secondary vehicle 320 is configured to generate a first alert for the driver of the secondary vehicle 320 in response to receiving the brake deterioration warning. The vehicle control module 324 may generate a visual alert by way of a first device of the secondary vehicle 320 capable of displaying the visual alert. For example, the visual alert may be a light or message that illuminates on a display or other suitable device of the secondary vehicle 320. Additionally or alternatively, the vehicle control module 324 of the secondary vehicle 320 may generate an audible alert by way of a second device of the secondary vehicle 320 capable of producing the audible alert. For example, an audible alert may be a spoken message or audible sound sent by the vehicle control module 324 to the radio or speakers of the secondary vehicle 320.

The brake evaluation system 108-12 may be further configured to calculate a minimum safe distance for the primary vehicle 104 relative to the secondary vehicle 320 and include the minimum safe distance in the brake deterioration warning. The vehicle control module 324 of the secondary vehicle 320 may be further configured to generate a second alert for the driver of the secondary vehicle 320 in response to a determination that a distance of the secondary vehicle 320 relative to the primary vehicle 104 is less than the minimum safe distance based on a current speed of the secondary vehicle 320 and a current speed of the primary vehicle 104. As a result, the driver of the secondary vehicle 320 may adjust vehicle speed by accelerating the secondary vehicle 320 to increase the distance relative to the primary vehicle 104.

Similarly, the brake alert control system 108-10 may be further configured to generate a second alert for the driver of the primary vehicle 104 in response to a determination that the distance of the primary vehicle 104 relative to the secondary vehicle 320 is less than the minimum safe distance based on the current speed of the secondary vehicle 320 and the current speed of the primary vehicle 104. As a result, the driver of the primary vehicle 104 may decrease vehicle speed by applying the brakes of the primary vehicle 104 to slow down the primary vehicle 104 and increase the distance relative to the secondary vehicle 320. In some instances, when the driver of the primary vehicle 104 has not applied the brakes of the primary vehicle 104 in response to receiving the second alert, the brake alert control system 108-10 may apply the brakes of the primary vehicle 104.

In another embodiment, the secondary vehicle 320 may receive the brake deterioration warning by way of an intermediate vehicle 340. The intermediate vehicle 340 includes an intermediate transceiver 348, which can be any suitable transceiver, including a DSRC transceiver. The intermediate transceiver 348 is configured to receive information transmitted from the primary transceiver 308 of the primary vehicle 104, including the brake deterioration warning from the primary vehicle 104. In the most basic form, the brake deterioration warning may just be a message or signal indicating that the primary vehicle's 104 brake performance has deteriorated. In a more advanced form, the brake deterioration warning may include other information related to operating parameters of the primary vehicle 104. Any suitable operating parameter may be provided by the primary vehicle 104 to the intermediate vehicle 340, such as the primary vehicle's 104 speed, the primary vehicle's 104 distance relative to the intermediate vehicle 340 and the primary vehicle's 104 intended route. Data received by the intermediate transceiver 348 is processed by an intermediate vehicle control module 344 of the intermediate vehicle 340.

The intermediate vehicle control module 344 of the intermediate vehicle 340 is configured to transmit such information using the intermediate transceiver 348, as well as transmit a second brake deterioration warning related to the condition of brakes for the intermediate vehicle 340, if equipped with the brake evaluation system 108-12. Such transmissions from the intermediate vehicle 340 advantageously provide the secondary vehicle 320, as well as any other surrounding vehicles or devices, with an early warning regarding brake performance of surrounding vehicles so that the secondary vehicle 320 may take appropriate action to maintain adequate distance between the intermediate vehicle 340 and/or the primary vehicle 104. Such transmissions from the intermediate vehicle 340 further increase the range of the primary transceiver 308 of the primary vehicle 104.

The brake evaluation system 108-12 may be further configured to calculate a minimum safe distance for the primary vehicle 104 relative to the intermediate vehicle 340 and include the minimum safe distance in the brake deterioration warning. The intermediate vehicle control module 344 may be further configured to generate a second alert for the driver of the intermediate vehicle 340 in response to a determination that a distance of the intermediate vehicle 340 relative to the primary vehicle 104 is less than the minimum safe distance based on a current speed of the intermediate vehicle 340 and a current speed of the primary vehicle 104. As a result, the driver of the intermediate vehicle 340 may adjust vehicle speed by accelerating the intermediate vehicle 340 to increase the distance relative to the primary vehicle 104.

Similarly, the brake alert control system 108-10 may be further configured to generate a second alert for the driver of the primary vehicle 104 in response to a determination that the distance of the primary vehicle 104 relative to the intermediate vehicle 340 is less than the minimum safe distance based on the current speed of the intermediate vehicle 340 and the current speed of the primary vehicle 104. As a result, the driver of the primary vehicle 104 may decrease vehicle speed by applying the brakes of the primary vehicle 104 to slow down the primary vehicle 104 and increase the distance relative to the intermediate vehicle 340. In some instances, when the driver of the primary vehicle 104 has not applied the brakes of the primary vehicle 104 in response to receiving the second alert, the brake alert control system 108-10 may apply the brakes of the primary vehicle 104.

Although FIG. 3 illustrates only a single intermediate vehicle 340, any suitable number of intermediate vehicles 340 can be present. The functionality of the system involving the intermediate vehicles 340 and a second intermediate vehicle 340, when the second intermediate vehicle 340 includes the intermediate transceiver 348 and the intermediate vehicle control module 344, is similar to the functionality of the system between the intermediate vehicle 340 and the secondary vehicle 320.

Transmission of the brake deterioration warning is not limited to transmission between the primary vehicle 104, the intermediate vehicle 340 and the secondary vehicle 320. The brake deterioration warning may also be transmitted by the primary transceiver 308 of the primary vehicle 104 to a device transceiver (not shown in FIG. 3) for a secondary device 364 that is configured to receive the brake deterioration warning from the primary transceiver 308. For example, a pedestrian 360 holding the secondary device 364 (such as a mobile phone or similar portable device) may benefit from receiving the brake deterioration warning from the primary vehicle 104 by refraining from crossing the street at a time when the primary vehicle 104 is traveling toward the pedestrian. In other implementations, a person 360 may be driving a vehicle that is not capable of receiving the brake deterioration warning, but may have the secondary device 364. In this instance, the driver of the vehicle may benefit from the brake deterioration warning in same way as the driver of the secondary vehicle 320.

Figure 4:
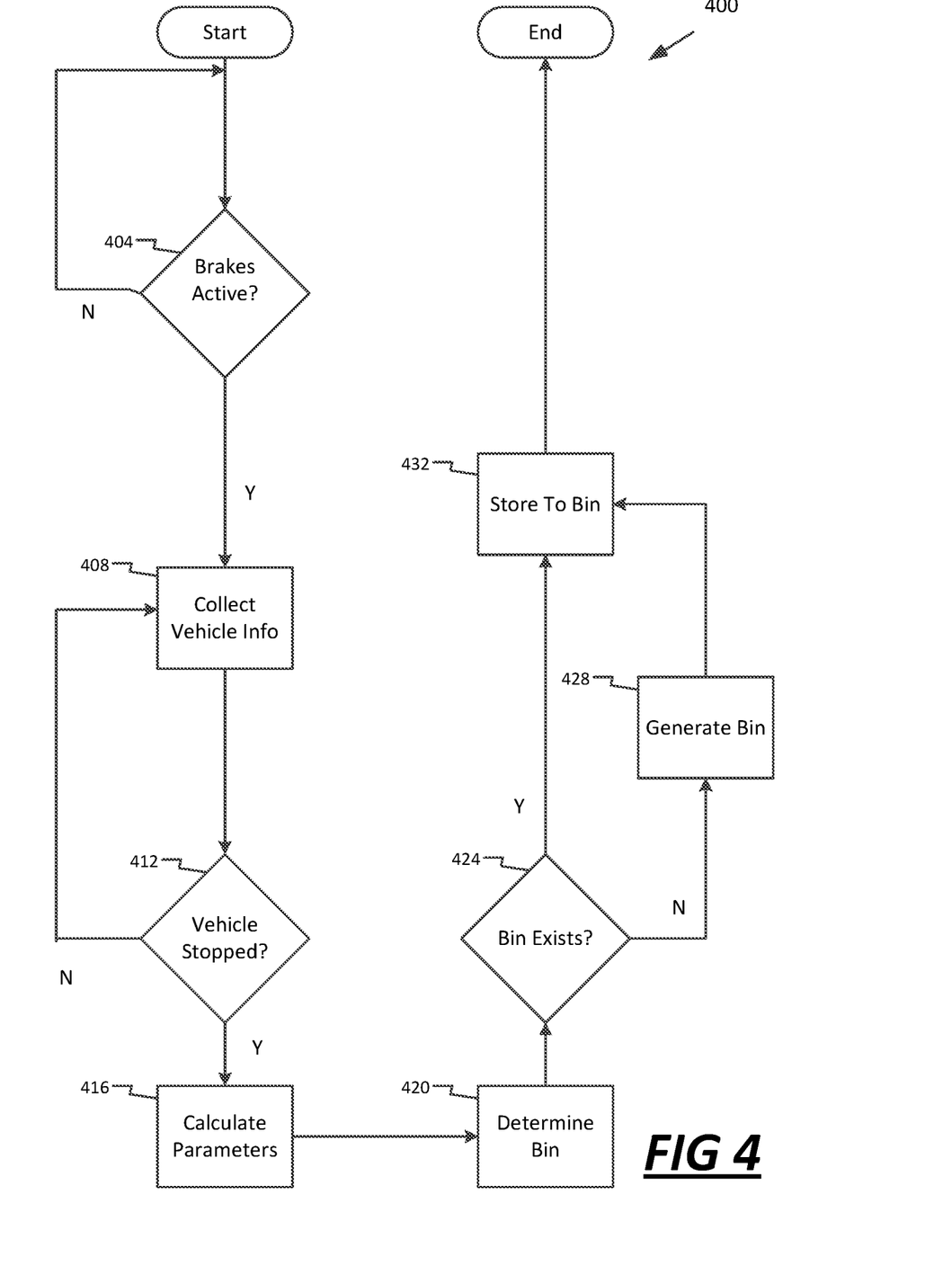
FIG. 4 is a flowchart for a method according to the present teachings for calculating a brake event's data and saving the brake event data to an appropriate bin.

With reference to FIG. 4, a method 400 is shown. The method 400 is configured to calculate the data for a brake event of the primary vehicle 104, referred to as the brake event data. The method can be performed by the brake warning system 108, the brake evaluation system 108-12, the brake alert control system 108-10, a combination thereof, or any other suitable control or processing device. The method begins at 404.

At 404, the brake evaluation system 108-12 receives the BP signal 228 from the brake pedal position sensor of the sensors 108-14 when the brake pedal of the primary vehicle 104 is first engaged (referred to as a beginning of the brake event). If the brakes of the primary vehicle 104 have not been engaged control returns to 404. Once it has been detected that the brake pedal of the primary vehicle 104 is engaged, control continues at 408.

At 408, the brake evaluation system 108-12 collects vehicle and environmental information related to conditions that may have impacted the brake event from the sensors 108-14. At 412, the brake event calculation unit 244 determines whether the primary vehicle 104 has stopped (or is within a predetermined nominal speed of stopping) and/or the brake pedal of the primary vehicle 104 is disengaged. If 412 is false, control continues back to 408, where additional vehicle and environmental information is collected. If 412 is true, control continues to 416. At 416, the brake event calculation unit 244 calculates the parameters for the brake event data including the braking distance and the braking time.

At 420, the bin determination unit 248 uses vehicle and environment information collected through the OS signals 216, the SD signal 224, the BP signal 228 and the GPS signal 220 to classify conditions that may have impacted the brake event. At 424, the bin determination unit 248 determines whether a corresponding bin currently exists for the particular brake event. If 424 is true, control continues at 432. If 424 is false, control continues at 428. At 428, in response to the determination that a bin with similar brake events does not exist, the bin determination unit 248 is configured to generate a new bin for the brake event. At 432, the bin determination unit 248 is configured to store the data for the particular brake event into an existing bin with similar brake events or store the data for the particular brake event into the newly generated bin and control may end. While the example of FIG. 4 is shown as ending, the example of FIG. 4 may be illustrative of one control loop and control returns to 404.

Figure 5:
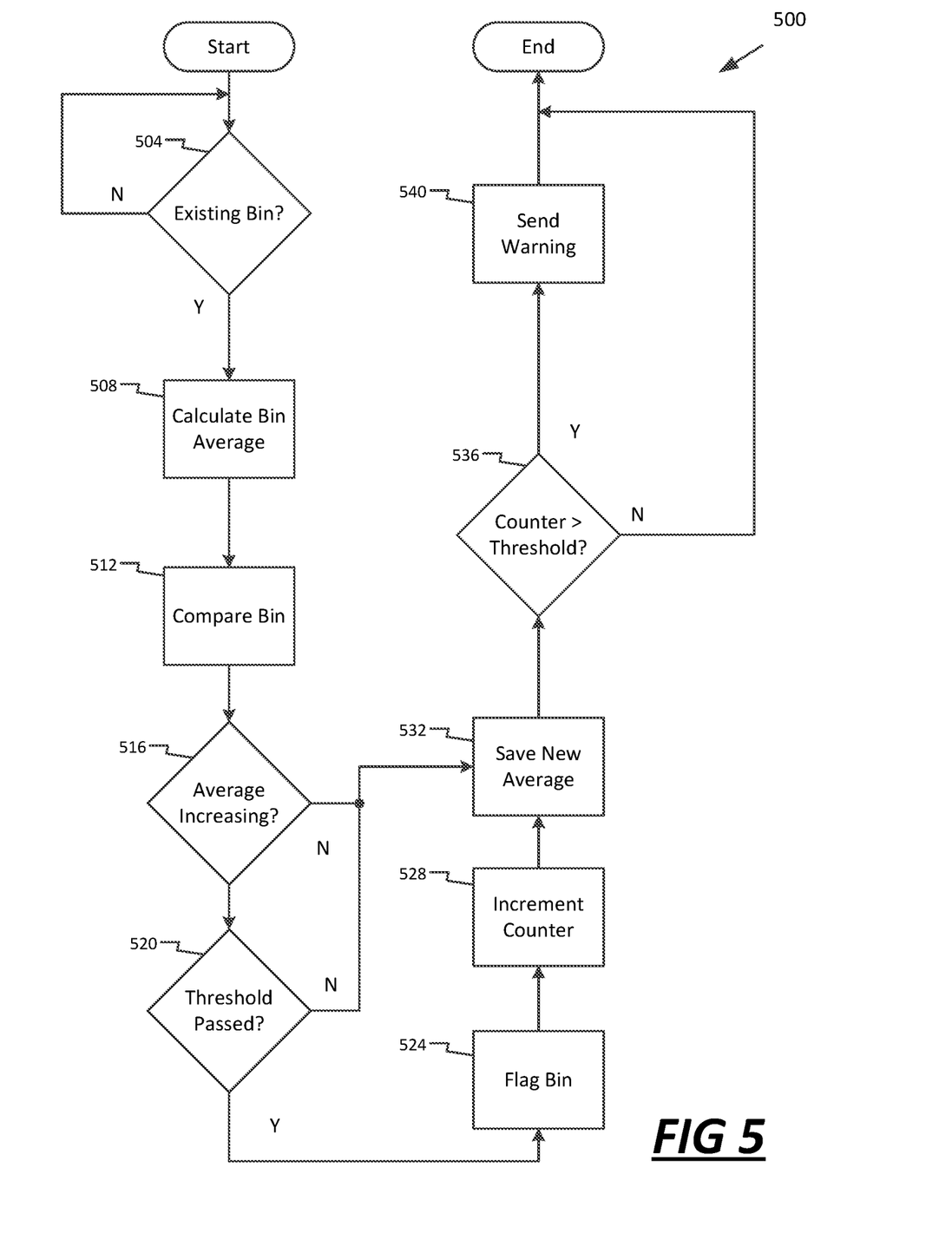
FIG. 5 is flowchart for a method according to the present teachings configured to evaluate brake performance for bin brake data of the primary vehicle.

With reference to FIG. 5, a method 500 is shown. The method 500 is configured to evaluate brake data for all bins and/or a particular bin's average brake data. The method can be performed by the brake warning system 108, the brake evaluation system 108-12, the brake alert control system 108-10, a combination thereof, or any other suitable control or processing device. The method begins at 504. At 504 the bin comparison unit 252 checks the bins to determine whether new brake event data was added to an existing bin. If false, the bin determination unit 248 generated a new bin for the new brake event and the average for the bin becomes the particular brake event's data and control ends. If true control continues to 508. At 508, the bin comparison unit 252 calculates a new average for the bin that contains the latest brake event data. At 512, the bin comparison unit 252 compares the previous average for the bin to the new average for the bin. The bin comparison unit 252 will compute a rate at which the new average of the brake data for the bin is increasing or decreasing when compared to the previous average of the brake data for the bin. Additionally or alternatively, the bin comparison unit 252 may compare the average for the bin to a set of baseline standards stored in a look up table of the memory of the brake evaluation system 108-12.

At 516, the bin comparison unit 252 determines whether the rate at which the average of the brake data for the bin is increasing over time is greater than the first predetermined threshold. If the rate at which the average of the brake data for the bin is not increasing, control continues at 532. If the rate at which the average of the brake data for the bin is increasing, control continues at 520. At 520, the bin comparison unit 252 determines whether the increase is within the first predetermined threshold. If the increase is within the first predetermined threshold, control continues at 532. If the first predetermined threshold is surpassed, control continues at 524. At 524, the bin comparison unit 252 flags the bin and control continues at 528. At 528, the bin comparison unit 252 increments the counter 260 and control continues at 532. At 532, the bin comparison unit 252 saves the new average of the bin. After the new average for the bin has been saved, control continues at 536.

At 536, the bin comparison unit 252 compares the value of the counter to the second predetermined threshold. As previously stated, the counter represents the number of flagged bins. If 536 is false control ends. If 536 is true, control continues at 540. At 540, the bin comparison unit 252 is configured to send the driver alert signal 232 to the brake alert control system 108-10 to provide the driver of the primary vehicle 104 with the brake deterioration warning. While the example of FIG. 5 is shown as ending, the example of FIG. 5 may be illustrative of one control loop and control may return to 504.

Figure 6:
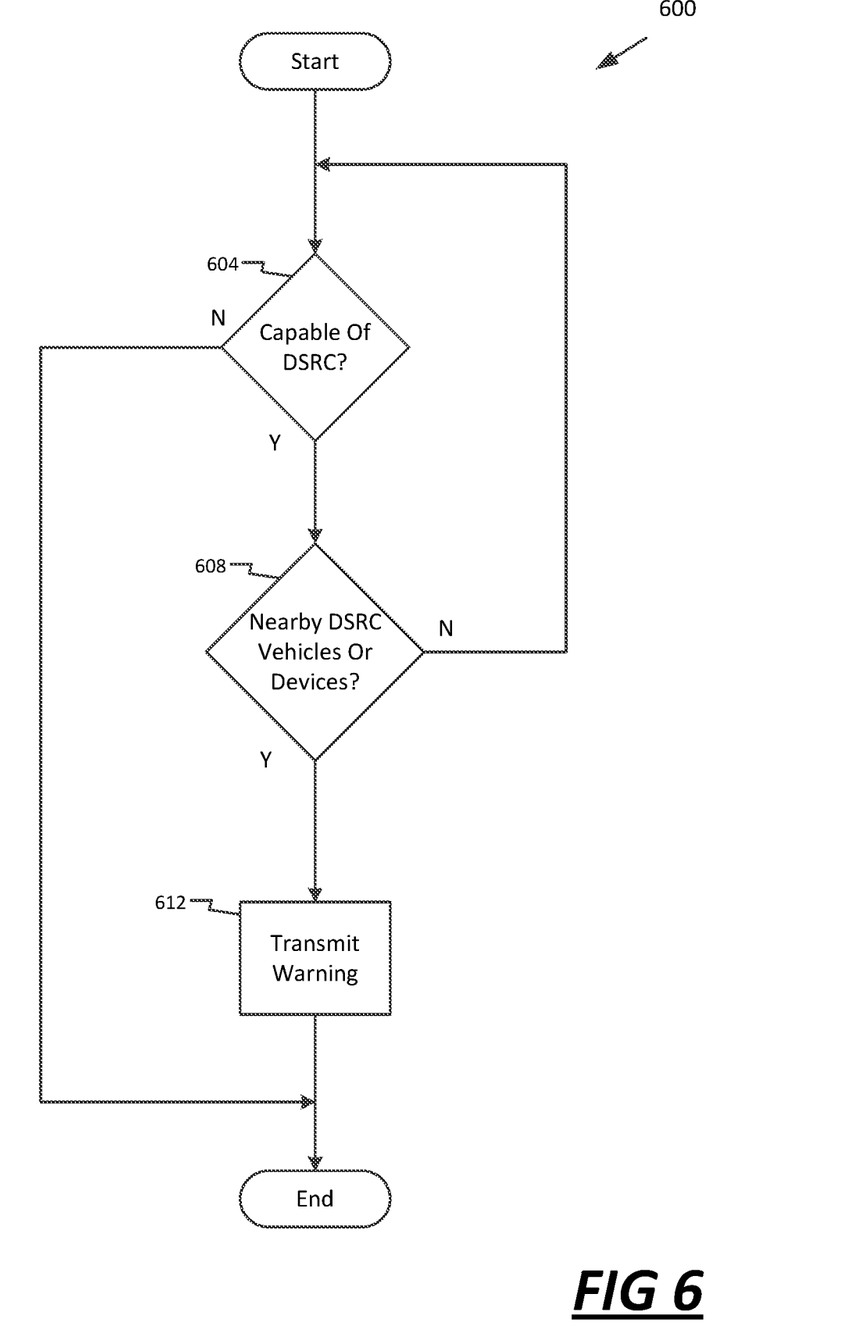
FIG. 6 is a flowchart for a method configured to transmit the brake deterioration warning of the primary vehicle to a surrounding vehicle or device using dedicated short range commination (DSRC).

With reference to FIG. 6, a method 600 is shown. The method 600 is configured to transmit the brake deterioration warning generated by the brake warning system 108 of the primary vehicle 104 to at least one of: the secondary vehicle 320, the intermediate vehicle 340, and the secondary device 364. The method can be performed by the brake warning system 108, the brake evaluation system 108-12, the brake alert control system 108-10, a combination thereof, or any other suitable control or processing device. The vehicle or device receiving the brake deterioration warning may be equipped with a similar system to the brake warning system 108 or any other suitable control or processing system capable of receiving and processing the brake deterioration warning.

The method begins at 604. At 604, the brake alert control system 108-10 determines whether the primary vehicle 104 is capable of DSRC, or any other suitable form of communication, by determining whether the primary vehicle is equipped with the primary transceiver 308. If false, control ends. If true, control continues at 608. At 608, the brake alert control system 108-10 determines whether there are any secondary vehicles 320 nearby or within DSRC range. If false, control ends. If true, control continues at 612.

At 612, the primary transceiver 308 of the primary vehicle 104 transmits the brake deterioration warning to the secondary vehicle 320 and control ends. While the secondary vehicle 320 is used as an example to explain method 600; as previously discussed, the vehicle could also be the intermediate vehicle 340 or the secondary device 364. The vehicle control module 324 of the secondary vehicle 320 is configured to generate an alert for the driver of the secondary vehicle 320 in response to receiving in response to the secondary transceiver 328 receiving the brake deterioration warning. While the example of FIG. 6 is shown as ending, the example of FIG. 6 may be illustrative of one control loop and control may return to 604.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A brake warning system comprising:
    a plurality of sensors configured to detect conditions that impact brake performance of a primary vehicle, the plurality of sensors including at least one of a traction sensor and a road condition sensor that detect a condition of a road upon which the primary vehicle is traveling;
    a brake evaluation system of the primary vehicle configured to (i) receive information from at least one of the plurality of sensors; (ii) determine brake event data for a brake event associated with actuating a brake system of the primary vehicle, the brake event data including at least one of a braking time and a braking distance; (iii) determine the condition of the road upon which the primary vehicle is traveling during the brake event based on information from the at least one of the traction sensor and the road condition sensor, (iv) store the brake event data in a bin that corresponds to the condition of the road associated with the brake event; (v) determine an average of the brake data for the bin; (vi) determine whether a rate at which the average of the brake data for the bin is increasing over time is greater than a first predetermined threshold; (vii) flag the bin in response to the determining that the rate at which the average of the brake data for the bin is increasing over time is greater than a first predetermined threshold; (viii) determine whether a number of flagged bins is greater than a second predetermined threshold; and (ix) generate a driver alert signal in response to determining that the number of flagged bins is greater than the second predetermined threshold; and
    a brake alert control system configured to generate an alert to a driver of the primary vehicle in response to receiving the driver alert signal.

2. The brake warning system of claim 1,
    wherein the brake evaluation system is further configured to increment a counter when the bin is flagged and reset the counter in response to determining that at least one of the brakes of the primary vehicle were serviced and one or more tires of the primary vehicle were serviced;
    wherein the brake evaluation system is further configured to determine whether a current bin exists for the condition of the road associated with the brake event; and
    wherein the brake evaluation system is further configured to generate a new bin for the brake event in response to determining that the current bin does not exist for the condition of the road associated with the brake event.

3. The brake warning system of claim 1, further comprising:
    a primary transceiver for the primary vehicle that is configured to transmit a brake deterioration warning when prompted by the brake alert control system;
    a secondary transceiver for a secondary vehicle that is configured to receive the brake deterioration warning from the primary transceiver of the primary vehicle; and
    a secondary vehicle control module configured to, in response to the secondary transceiver receiving the brake deterioration warning, generate an alert to the driver of the secondary vehicle.

4. The brake warning system of claim 3, further comprising:
    an intermediate vehicle between the primary vehicle and the secondary vehicle, the intermediate vehicle including an intermediate transceiver and an intermediate vehicle control module;
    wherein the intermediate transceiver is configured to receive the brake deterioration warning from the primary vehicle and transmit the brake deterioration warning to the secondary vehicle when prompted by the brake alert control system; and
    wherein the intermediate vehicle control module is configured to, in response to the intermediate transceiver receiving the brake deterioration warning, generate an alert to the driver of the intermediate vehicle.

5. The brake warning system of claim 3,
    wherein the brake evaluation system is further configured to calculate a minimum safe distance for the primary vehicle relative to the secondary vehicle and include the minimum safe distance in the brake deterioration warning;
    wherein the secondary vehicle control module is further configured to generate a second alert for the driver of the secondary vehicle, in response to a determination that a distance of the secondary vehicle relative to the primary vehicle is less than the minimum safe distance, based on a current speed of the secondary vehicle and a current speed of the primary vehicle; and
    wherein the brake alert control system is further configured to generate a second alert for the driver of the primary vehicle, in response to a determination that the distance of the primary vehicle relative to the secondary vehicle is less than the minimum safe distance, based on the current speed of the secondary vehicle and the current speed of the primary vehicle.

6. The brake warning system of claim 5, wherein the brake alert control system is further configured to apply one or more brakes of the primary vehicle when the driver of the primary vehicle has not applied the brakes of the primary vehicle in response to receiving the second alert.

7. The brake warning system of claim 1, further comprising:
    a primary transceiver for the primary vehicle that is configured to transmit a brake deterioration warning when prompted by the brake alert control system;
    a device transceiver for a secondary device that is configured to receive the brake deterioration warning from the primary transceiver of the primary vehicle; and
    a secondary device control module configured to, in response to the device transceiver receiving the brake deterioration warning, generate an alert to a person associated with the secondary device.

8. The brake warning system of claim 1, further comprising at least one of: a global positioning system (GPS), a global navigation satellite system (GNSS), a geographic information system (GIS), and web mapping system that communicate with the brake evaluation system to provide at least one of:
- a location of the primary vehicle;
- a movement path for the primary vehicle; and
- an elevation profile for the movement path of the primary vehicle.

9. The brake warning system of claim 1, wherein the plurality of sensors additionally include at least one of: an accelerator pedal position sensor, a brake pedal position sensor, a throttle position sensor, a tire pressure sensor, a temperature sensor, an inertial measurement unit (IMU) sensor, a lidar sensor, a radar sensor, a sonar sensor, a collision detection sensor, a weight sensor, a camera, a wheel speed sensor, a vehicle speed sensor, and an anti-lock braking system (ABS) sensor.

10. The brake warning system of claim 1,
wherein a braking distance begins where a brake pedal of the primary vehicle is first engaged and ends where the primary vehicle is stopped and/or the brake pedal of the primary vehicle is disengaged; and
wherein a braking time that begins when the brake pedal of the primary vehicle is first engaged and ends when at least one of the primary vehicle is stopped and the brake pedal of the primary vehicle is disengaged.

11. A method for warning a vehicle of brake deterioration, the method comprising: (i) detecting conditions that impact brake performance of a primary vehicle through a plurality of sensors, the plurality of sensors including at least one of a traction sensor and a road condition sensor that detect a condition of a road upon which the primary vehicle is traveling; (ii) receiving information from at least one of the plurality of sensors; (iii) determining brake event data for a brake event associated with actuating a brake system of the primary vehicle; (iv) determining the condition of the road upon which the primary vehicle is traveling during the brake event based on information from the at least one of the traction sensor and the road condition sensor; (v) storing the brake event data in a bin that corresponds to the condition of the road associated with the brake event; (vi) determining an average of the brake data for the bin; (vii) determining whether a rate at which the average of the brake data for the bin is increasing over time is greater than a first predetermined threshold; (viii) flagging the bin in response to determining that the rate at which the average of the brake data for the bin is increasing over time greater than a first predetermined threshold; (ix) determining whether a number of flagged bins is greater than a second predetermined threshold; and (x) generating an alert to a driver of a primary vehicle in response to determining that the number of flagged bins is greater than the second predetermined threshold.

12. The method of claim 11, further comprising incrementing a counter when the bin is flagged and resetting the counter in response to determining that at least one of the brakes of the primary vehicle were serviced and one or more tires of the primary vehicle were serviced.

13. The method of claim 11, further comprising:
transmitting information regarding the brake deterioration warning from the primary transceiver of the primary vehicle;
receiving the information regarding the brake deterioration warning from a secondary transceiver of a secondary vehicle; and
generating an alert for a driver of a secondary vehicle in response to receiving the brake deterioration warning.

14. The method of claim 13, further comprising:
determining a minimum safe distance for the primary vehicle relative to the secondary vehicle and including the minimum safe distance in the brake deterioration warning;
generating a second alert for the driver of the secondary vehicle, in response to the determination that a distance of the secondary vehicle relative to the primary vehicle is less than the minimum safe distance, based on a current speed of the secondary vehicle and a current speed of the primary vehicle; and
generating a second alert for the driver of the primary vehicle, in response to the determination that the distance of the primary vehicle relative to the secondary vehicle is less than the minimum safe distance, based on the current speed of the secondary vehicle and the current speed of the primary vehicle.

15. The method of claim 14, further comprising applying the brakes of the primary vehicle in response to the determination that the driver of the primary vehicle has not applied the brakes of the primary vehicle in response to receiving the second alert.

16. The method of claim 11, further comprising:
transmitting information regarding the brake deterioration warning from a primary transceiver of the primary vehicle;
receiving the information regarding the brake deterioration warning from a device transceiver of a secondary device; and
generating an alert to a person associated with the secondary device in response to receiving the brake deterioration warning.

17. The method of claim 11, further comprising:
transmitting information regarding the brake deterioration warning from a primary transceiver of the primary vehicle;
receiving the information regarding the brake deterioration warning from an intermediate transceiver of an intermediate vehicle;
transmitting the brake deterioration warning from the intermediate transceiver of the intermediate vehicle to a secondary transceiver of a secondary vehicle; and
generating an alert for a driver of an intermediate vehicle in response to receiving the brake deterioration warning.

18. The method of claim 11, further comprising receiving signals from at least one of: a global positioning system (GPS), a global navigation satellite system (GNSS), a geographic information system (GIS), and web mapping system, in response to receiving the signals, determining at least one of:
- a location of the primary vehicle;
- a movement path for the primary vehicle; and
- an elevation profile for the movement path of the primary vehicle.

19. The method of claim 11, wherein the plurality of sensors additionally include at least one of: an accelerator pedal position sensor, a brake pedal position sensor, a throttle position sensor, a tire pressure sensor, a temperature sensor, an inertial measurement unit (IMU) sensor, a lidar sensor, a radar sensor, a sonar sensor, a collision detection sensor, a weight sensor, a camera, a wheel speed sensor, a vehicle speed sensor, and an anti-lock braking system (ABS) sensor.

20. The method of claim 11, wherein the brake event data further comprises at least one of:

a braking distance that begins where a brake pedal of the primary vehicle is first engaged and ends where the primary vehicle is stopped and/or the brake pedal of the primary vehicle is disengaged; and a braking time that begins when the brake pedal of the primary vehicle is first engaged and ends when at least one of the primary vehicle is stopped and the brake pedal of the primary vehicle is disengaged.

* * * * *